United States Patent
Trinh et al.

(10) Patent No.: US 12,198,138 B1
(45) Date of Patent: Jan. 14, 2025

(54) DISTRIBUTED LEDGER TECHNOLOGY UTILIZING CARDLESS PAYMENTS

(71) Applicant: Wells Fargo Bank, N.A., San Francisco, CA (US)

(72) Inventors: Duc M. Trinh, Golden Valley, MN (US); Nikolai Stroke, Gilbert, AZ (US); Harmit Singh Dhanoa, Mountain House, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 397 days.

(21) Appl. No.: 16/880,257

(22) Filed: May 21, 2020

(51) Int. Cl.
*G06Q 20/40* (2012.01)
*G06Q 20/38* (2012.01)
*G06F 21/32* (2013.01)

(52) U.S. Cl.
CPC ... *G06Q 20/40145* (2013.01); *G06Q 20/3821* (2013.01); *G06Q 20/3829* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 6,938,021 B2 * | 8/2005 | Shear | G06Q 30/0257 705/67 |
| 9,736,147 B1 * | 8/2017 | Mead | G06F 21/31 |
| 10,013,573 B2 | 7/2018 | Dillenberger | |
| 10,037,420 B1 * | 7/2018 | Ibrahim | G06F 21/32 |
| 10,042,993 B2 * | 8/2018 | Beigi | G06F 21/32 |
| 10,289,987 B1 * | 5/2019 | Walker | G07F 19/203 |
| 10,482,511 B1 * | 11/2019 | Artman | G06Q 30/0601 |
| 10,540,644 B1 * | 1/2020 | Walker | G07F 19/203 |
| 11,101,993 B1 * | 8/2021 | Shahidzadeh | H04L 9/0863 |

(Continued)

FOREIGN PATENT DOCUMENTS

| | | | | |
|---|---|---|---|---|
| AU | 2006335151 A1 * | 8/2008 | | G06F 16/00 |
| AU | 2018427245 B1 * | 2/2020 | | G06F 16/9035 |

(Continued)

OTHER PUBLICATIONS

A Decentralised Digital Identity Architecture. https://arxiv.org/pdf/1902.08769v6.pdf (Year: 2019).*

(Continued)

*Primary Examiner* — El Mehdi Oussir
(74) *Attorney, Agent, or Firm* — Foley & Lardner LLP

(57) ABSTRACT

Systems, methods and computer-readable storage media utilized to complete a cardless transaction on a distributed ledger network. One method includes receiving, by a point-of-sale (POS) computing device, a transaction request including a biometric sample from an individual associated with a payment account at a financial institution. The method further includes authenticating, by the POS computing device, the biometric sample by cross-referencing the biometric sample with a biometric dataset stored on the distributed ledger network. The method further includes, in response to authenticating the biometric sample, generating, by the POS computing device, a cryptogram associated with the biometric sample and processing, by the POS computing device, the transaction request utilizing the cryptogram.

14 Claims, 9 Drawing Sheets

(56) References Cited

U.S. PATENT DOCUMENTS

| | | | | |
|---|---|---|---|---|
| 11,367,323 | B1* | 6/2022 | Shahidzadeh | G07C 9/37 |
| 11,373,187 | B1* | 6/2022 | Cash | G06Q 20/206 |
| 11,785,004 | B2* | 10/2023 | Soon-Shiong | G16B 50/00 |
| 11,915,243 | B2* | 2/2024 | Cash | H04L 63/0861 |
| 2009/0063345 | A1* | 3/2009 | Erikson | G06Q 40/02 |
| | | | | 705/44 |
| 2010/0235285 | A1* | 9/2010 | Hoffberg | G06Q 50/188 |
| | | | | 705/37 |
| 2010/0317420 | A1* | 12/2010 | Hoffberg | G06Q 30/0282 |
| | | | | 463/1 |
| 2013/0073389 | A1* | 3/2013 | Heath | G06Q 30/02 |
| | | | | 705/14.54 |
| 2013/0159021 | A1* | 6/2013 | Felsher | G16H 10/60 |
| | | | | 705/3 |
| 2013/0246199 | A1* | 9/2013 | Carlson | G06Q 20/405 |
| | | | | 705/16 |
| 2014/0136419 | A1* | 5/2014 | Kiyohara | G06Q 20/40145 |
| | | | | 705/67 |
| 2014/0250018 | A1* | 9/2014 | Phillips | G06Q 20/405 |
| | | | | 705/72 |
| 2015/0156176 | A1* | 6/2015 | Collinge | H04L 63/062 |
| | | | | 713/168 |
| 2016/0019536 | A1* | 1/2016 | Ortiz | G06Q 20/36 |
| | | | | 705/67 |
| 2016/0173492 | A1* | 6/2016 | Han | H04L 63/0853 |
| | | | | 705/16 |
| 2016/0239833 | A1* | 8/2016 | Venugopalan | G06Q 20/38215 |
| 2016/0364703 | A1* | 12/2016 | Bhatt | G06Q 20/38215 |
| 2017/0046714 | A1* | 2/2017 | Van De Velde | G06F 21/32 |
| 2017/0046806 | A1 | 2/2017 | Haldenby et al. | |
| 2017/0103382 | A1* | 4/2017 | Kim | G06Q 20/204 |
| 2017/0364920 | A1* | 12/2017 | Anand | H04L 63/0861 |
| 2018/0053160 | A1 | 2/2018 | Schwartz et al. | |
| 2018/0053161 | A1 | 2/2018 | Bordash et al. | |
| 2019/0050921 | A1* | 2/2019 | Ryner | G06Q 20/204 |
| 2019/0066089 | A1* | 2/2019 | Miryala | G06Q 20/367 |
| 2019/0205889 | A1 | 7/2019 | Cantrell et al. | |
| 2019/0205894 | A1 | 7/2019 | Gonzales, Jr. et al. | |
| 2019/0318345 | A1* | 10/2019 | Kallugudde | G06Q 20/3226 |
| 2020/0013051 | A1* | 1/2020 | Kadiwala | H04L 63/068 |
| 2020/0193410 | A1* | 6/2020 | Kaja | G06Q 20/322 |
| 2021/0118054 | A1* | 4/2021 | Turner | G06Q 10/10 |
| 2021/0174426 | A1* | 6/2021 | Isaacson | G06Q 50/01 |
| 2021/0374861 | A1* | 12/2021 | McClelland | H04L 9/50 |
| 2022/0005047 | A1* | 1/2022 | Maheshwari | G06Q 20/40145 |
| 2022/0012672 | A1* | 1/2022 | Inman | G06F 21/32 |
| 2022/0292543 | A1* | 9/2022 | Henderson | G06Q 30/0252 |
| 2022/0318852 | A1* | 10/2022 | Blaikie, III | G06Q 30/0255 |
| 2022/0343326 | A1* | 10/2022 | Seal | G06Q 20/4012 |
| 2022/0366494 | A1* | 11/2022 | Cella | H04L 9/50 |
| 2023/0162191 | A1* | 5/2023 | Valencia | G06Q 20/389 |
| | | | | 705/69 |
| 2023/0177489 | A1* | 6/2023 | Chan | G06Q 20/3672 |
| | | | | 705/66 |
| 2023/0230085 | A1* | 7/2023 | Turgeman | G06Q 20/40145 |
| | | | | 705/44 |
| 2024/0152645 | A1* | 5/2024 | Blaikie, III | G06F 21/6245 |

FOREIGN PATENT DOCUMENTS

| | | | | |
|---|---|---|---|---|
| CN | 109691014 | A * | 4/2019 | G06F 21/32 |
| CN | 111684412 | A * | 9/2020 | G06F 21/602 |
| EP | 3276556 | A1 * | 1/2018 | G06F 21/32 |
| EP | 3474207 | A1 * | 4/2019 | |
| EP | 3624037 | A1 * | 3/2020 | G06K 7/1413 |
| IN | 201721040860 | A * | 12/2017 | |
| KR | 20090001952 | A * | 5/2007 | |
| KR | 20090002210 | A * | 6/2007 | |
| WO | WO2018/0195644 | | 11/2018 | |
| WO | WO2019/0032113 | | 2/2019 | |
| WO | WO2019/0162957 | | 8/2019 | |
| WO | WO-2020013940 | A1 * | 1/2020 | G06Q 20/027 |
| WO | WO-2020076845 | A1 * | 4/2020 | G06F 21/32 |
| WO | WO-2020086668 | A1 * | 4/2020 | G06Q 20/322 |
| WO | WO-2020112865 | A1 * | 6/2020 | G06F 21/32 |

OTHER PUBLICATIONS

A. K. Jain and S. Pankanti, "A touch of money [biometric authentication systems]," in IEEE Spectrum, vol. 43, No. 7, pp. 22-27, Jul. 2006, doi: 10.1109/MSPEC.2006.1653001. https://ieeexplore.ieee.org/stamp/stamp.jsp?tp=&arnumber=1653001 (Year: 2006).*

Gad et al., Multi-Biometric Systems: A State of the Art Survey and Research Directions. International Journal of Advanced Computer Science and Applications vol. 6, No. 6, 2015. https://pdfs.semanticscholar.org/4534/953f7aa995649693b0d6f006715ffdee591c.pdf (Year: 2015).*

A. Dey, S. Jain and S. Nandi, "New Method of POS based on Artificial Intelligence and Cloud Computing," 2019 International Conference on Recent Advances in Energy-efficient Computing and Communication, Nagercoil, India, 2019, pp. 1-6. https://ieeexplore.ieee.org/document/8995078?source=IQplus (Year: 2019).*

T. Zhou, X. Li and H. Zhao, "DLattice: A Permission-Less Blockchain Based on DPoS-BA-DAG Consensus for Data Tokenization," in IEEE Access, vol. 7, pp. 39273-39287. https://ieeexplore.ieee.org/document/8672629?source=IQplus (Year: 2019).*

M. Bond, O. Choudary, S. J. Murdoch, S. Skorobogatov and R. Anderson, "Chip and Skim: Cloning EMV Cards with the Pre-play Attack," 2014 IEEE Symposium on Security and Privacy, Berkeley, CA, USA, 2014, pp. 49-64. https://ieeexplore.ieee.org/document/6956556?source=IQplus (Year: 2014).*

* cited by examiner

DISTRIBUTED LEDGER TECHNOLOGY UTILIZING CARDLESS PAYMENTS

BACKGROUND

The present disclosure relates generally to the field of distributed ledger technology (DLT). In a computer networked environment such as the internet, users and entities such as people or companies purchase goods and services.

SUMMARY

Some arrangements relate to a method for completing a cardless transaction on a distributed ledger network, the method implemented by a point-of-sale (POS) computing device. The method includes receiving a transaction request including a biometric sample from an individual associated with a payment account at a financial institution. Further, the method includes authenticating the biometric sample by cross-referencing the biometric sample with a biometric dataset stored on the distributed ledger network. Further, the method in response to authenticating the biometric sample includes generating a cryptogram associated with the biometric sample and processing the transaction request utilizing the cryptogram.

In some arrangements, the method further includes receiving, from the individual, an enrollment request including payment account information associated with the individual and sending, to the distributed ledger network, the payment account information and the biometric sample. In various arrangements, the payment account information includes information corresponding to a payment card associated with the individual. In some arrangements, the biometric sample is associated with at least one of a biological characteristic or a behavioral characteristic that uniquely identifies the individual from another individual. In various arrangements, the biometric dataset includes a plurality of biometric reference data uniquely identifying a plurality of individuals, and wherein each biometric reference data is associated with a unique encryption key and a particular individual. In some arrangements, cross-referencing the biometric sample with the biometric dataset stored on the distributed ledger network further comprising matching the biometric sample with a biometric reference data of the plurality of biometric reference data uniquely identifying the individual. In various arrangements, the method further includes receiving a second transaction request including a second biometric sample from the individual. Further, the method includes authenticating the second biometric sample by cross-referencing the second biometric sample with the biometric dataset. Further, the method in response to authenticating the second biometric sample includes generating a second cryptogram associated with the second biometric sample processing the transaction request utilizing the second cryptogram. In some arrangements, the transaction request is associated with at least one of a purchase of a good, or a purchase of a service. In various arrangements, the POS computing device is a node on the distributed ledger network. In some arrangements, the POS computing device is associated with a plurality of POS computing devices, and wherein the plurality of POS computing devices are a node on the distributed ledger network.

Some arrangements relate to a computing system. The computing system includes a database configured to store a biometric dataset for payment accounts associated with individuals. Further, the computing system includes a biometric sensor configured to receive a biometric sample from an individual. Further, the computing system includes a network interface configured to communicate over a distributed ledger network with a plurality of nodes and a point-of-sale (POS) computing device coupled the biometric sensor, the POS computing device configured to receive a transaction request including a biometric sample from the individual associated with a payment account at a financial institution. Further, the POS computing device configured to authenticate the biometric sample by cross-referencing the biometric sample with the biometric dataset stored in the database. Further, the POS computing device in response to authenticating the biometric sample configured to generate a cryptogram associated with the biometric sample and process the transaction request utilizing the cryptogram.

In some arrangements, the POS computing device further configured to receive, from the individual, an enrollment request including payment account information associated with the individual and send, to the distributed ledger network, the payment account information and the biometric sample. In various arrangements, the biometric sample is associated with at least one of a biological characteristic or a behavioral characteristic that uniquely identifies the individual from another individual. In some arrangements, the biometric dataset includes a plurality of biometric reference data uniquely identifying a plurality of individuals, and wherein each biometric reference data is associated with a unique encryption key and a particular individual. In various arrangements, cross-referencing the biometric sample with the biometric dataset stored on the distributed ledger network further comprising matching the biometric sample with a biometric reference data of the plurality of biometric reference data uniquely identifying the individual. In some arrangements, the POS computing device is a node on the distributed ledger network. In various arrangements, the POS computing device is associated with a plurality of POS computing device, and wherein the plurality of the POS computing device are a node on the distributed ledger network.

Some arrangements relate to one or more computer-readable storage media having instructions stored thereon that, when executed by at least one processing circuit, cause the at least one processing circuit to receive a transaction request including a biometric sample from an individual associated with a payment account at a financial institution. Further, the one or more computer-readable storage media having instructions stored thereon that, when executed by at least one processing circuit, cause the at least one processing circuit to authenticate the biometric sample by cross-referencing the biometric sample with a biometric dataset stored on a distributed ledger network. Further, the one or more computer-readable storage media having instructions stored thereon that, when executed by at least one processing circuit, in response to authenticating the biometric sample cause the at least one processing circuit to generate a cryptogram associated with the biometric sample and process the transaction request utilizing the cryptogram.

In some arrangements, the biometric dataset includes a plurality of biometric reference data uniquely identifying a plurality of individuals, and wherein each biometric reference data is associated with a unique encryption key and a particular individual. In various arrangements, cross-referencing the biometric sample with the biometric dataset stored on the distributed ledger network further comprising matching the biometric sample with a biometric reference data of the plurality of biometric reference data uniquely identifying the individual.

Figure 1A:
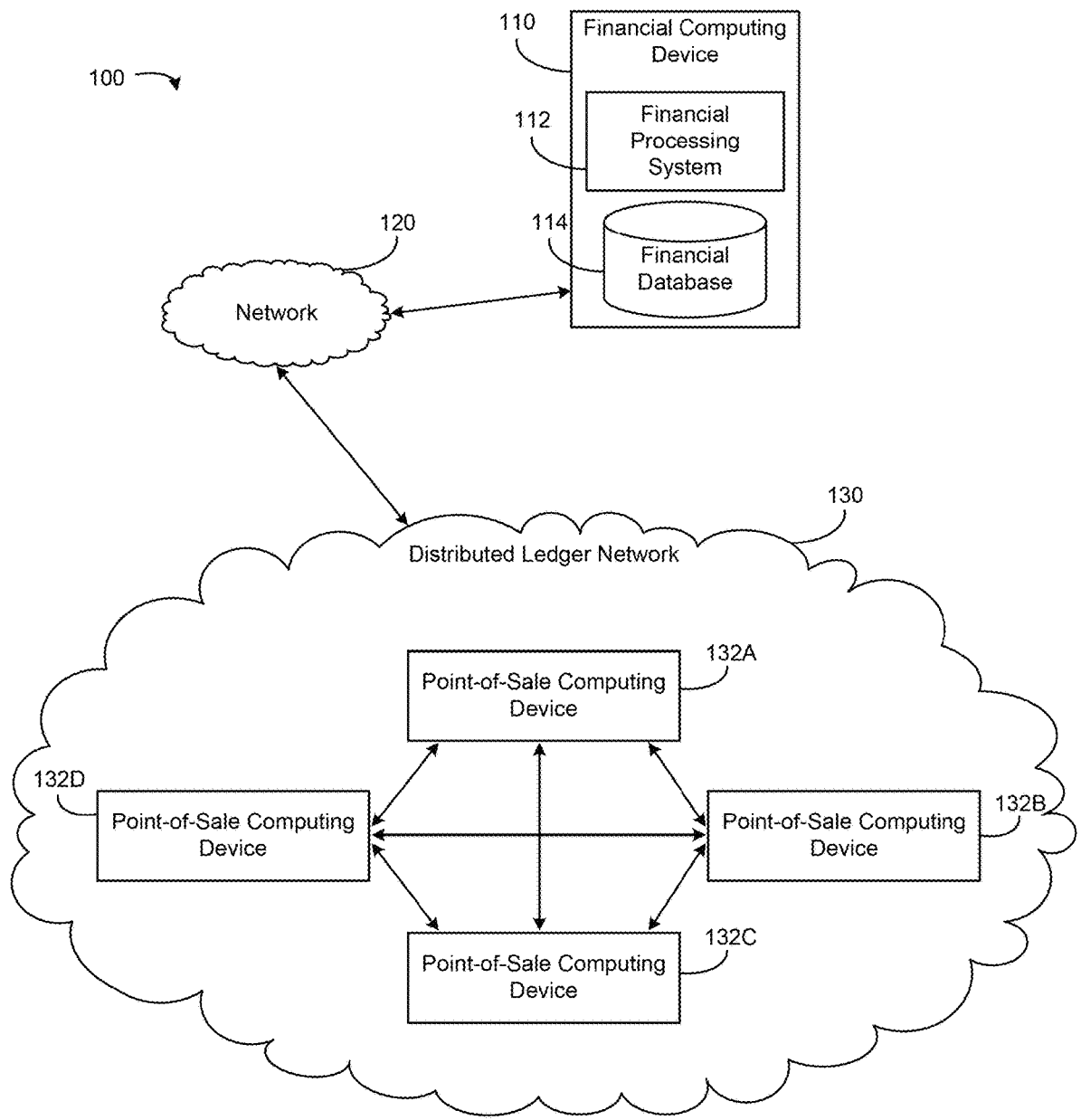
FIG. 1A is a block diagram depicting an example of a system for completing a cardless transaction on a distributed ledger network, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring to generally to the FIGS., the systems and methods relate generally to completing a cardless transaction on a distributed ledger network. In some embodiments, the causal completion of cardless transaction can include receiving and authenticating a transaction request based on a biometric sample of a customer. In particular, the biometric sample is authenticated based on cross-referencing the biometric sample with a biometric dataset stored on a distributed ledger network. As a result of authenticating the biometric sample, a cryptogram can be generated associated with the biometric sample and the transaction can be processed utilizing the cryptogram.

In many systems, individuals are asked to provide information in connection with receiving various goods or services. Oftentimes, individuals are asked to verify their identities with a second party involved in the transaction, be it another individual, a group of individuals, a commercial entity, or a government entity. That is, when a customer desires to complete a transaction (e.g., purchase of goods or services), the customer first presents a payment method in which the payment method can utilize one of two methods. The first payment method utilizes a physical card identifying the customer at a point-of-sale (POS) terminal (e.g., swipe, insert the chip, tap). The second payment method utilizes a digitized card on a computing device (e.g., phone, watch, etc. associated with a digital wallet) identifying the customer at a POS terminal. That is, the payment method to execute a transaction identifies the customer utilizing an external physical object (e.g., physical card, digitized card on a computing device). However, having to perform such payment methods is frustrating for individuals and may cause identity-theft issues for individuals. That is, the ability to complete a cardless transaction with a customer, such as providing biometric information as a payment method at a POS terminal that is connected to a distributed ledger network, provides customers enhanced ability to complete transactions without the burden of presenting one or more external physical objects that identify the customer. This causal approach enables POS terminals connected to a distributed ledger networks to process transactions utilizing biometric information while maintaining the security and privacy of the customers payment information. Therefore, aspect of the present disclosure address problems in distributed ledger technology (DLT) by providing cardless transactions that utilize biometric samples as a payment method such that POS terminals, on the distributed ledger network, can process transactions without burdening the customer to provide an external physical object as the payment method.

Accordingly, the present disclosure is directed to systems and methods for cardless transaction on a distributed ledger network such that transactions can be processed utilizing biometric samples. In some arrangements, the described system and methods involve utilizing a point-of-sale (POS) computing device. The POS computing device can receive a transaction request that includes a biometric sample from a customer of a financial institution. The POS computing device can then authenticate the biometric sample by cross-referencing the biometric sample with a biometric data stored on the distributed ledger network. In the present disclosure, once the biometric sample is authenticated the POS computing device can generate a cryptogram based on the payment instrument (e.g., POS computing device, mobile phone, financial computing device) and associated with the biometric sample and process the transaction utilizing the cryptogram. In some arrangements, a financial computing device can generate a cryptogram associated with the biometric sample and execute similar instructions to authenticate the biometric sample, as discussed with reference to the POS computing device.

In some arrangements, biometrics can be used for human identification and authentication for physical and logical access. Biometrics can be associated with a plurality of biometric data. Biometric data is a digital reference of an individual's (e.g., customer) distinct characteristics obtained by processing one or more biometric samples from the individual. Biometric data may include, for example, biological (fingerprint, iris/retina, hand geometry, facial geometry, DNA, etc.) and behavioral (e.g., gait, gesture, keystroke dynamics, speech pattern, foot movement pattern, etc.) characteristics that reliably distinguish one individual from another. Digital representations of these characteristics can be stored in an electronic medium (e.g., database), and later used to authenticate the identity of an individual. For example, the individual may upload a picture of themselves and during any subsequent authentication a computing device (e.g., POS computing device, financial computing device, and/or entity computing device) may validate the picture before completing the transaction. In this example, the computing device could validate the picture via a camera on the computing device comparing the camera picture with the uploaded picture of the individual.

Referring now to FIG. 1A, a block diagram depicting an example of a system 100 for completing a cardless transaction on a distributed ledger network 130 is shown, according to some arrangements. The system 100 is shown to include a financial computing device 110, a financial processing system 112, a financial database 114, a network 120, a distributed ledger network 130, and a plurality of point-of-sale computing device nodes (e.g., 132A, 132B, 132C, 132D). The network 120 may include a local area network (LAN), wide area network (WAN), a telephone network, such as the Public Switched Telephone Network (PSTN), a wireless link, an intranet, the Internet, or combinations thereof. The system 100 can also include at least one data processing system or processing circuit, such as a financial computing device 110. The financial computing device 110 can communicate via the network 120, for example with the point-of-sale computing device nodes 132A, 132B, 132C, 132D (collectively referred to herein as "POS computing device nodes 132") on the distributed ledger network 130. Referring to both FIGS. 1A-1B and FIGS. 2A-2B, the one or more processing circuits can include a microprocessor, an application specific integrated circuit (ASIC), a field-programmable gate array (FPGA), etc., or combinations thereof. A memory can include, but is not limited to, electronic, optical, magnetic, or any other storage or transmission device capable of providing processor with program instructions. Instructions can include code from any suitable computer programming language.

In some arrangements, the financial computing device 110 can be executed on one or more processing circuits, such as those described below in detail with reference to FIG. 5. In addition to the processing circuit, the financial computing device 110 may include one or more databases (e.g., financial database 114) configured to store data. The financial computing device 110 may also include a processing system (e.g., financial processing system 112) configured to receive data (e.g., requests) via the network 120 and provide data (e.g., financial information) from the financial computing device 110 to any of the other system and devices on network 120.

The financial computing device 110 may be communicably coupled and operate the POS computing device nodes 132A, 132B, 132C, 132D on the distributed ledger network 130. That is, the financial computing device 110 can provide the distributed ledger network 130 with data and/or information for completing transaction. For example, the financial computing device 110 can provide biometric information associated with an account of a financial institution to one and/or all of the POS computing device nodes 132A, 132B, 132C, 132D. In another example, the financial computing device 110 may utilize a processing circuit of the financial processing system to complete a transaction. Further, the data stored in the financial database 114 may store personal information (e.g., names, addresses, phone numbers, and so on), authentication information (e.g., username/password combinations, device authentication tokens, security question answers, unique client identifiers, biometric data, geographic data, social media data, etc.), and financial information (e.g., token information, account numbers, account balances, available credit, credit history, exchange histories, and so on) relating to the various users and associated financial accounts. In some arrangements, the financial database 114 may include a subset of databases such that the financial processing system 112 can analyze each database to determine the appropriate information to process a transaction request. In various arrangements, nodes of the distributed ledger network 130 may be communicably coupled to the financial processing system 112 such that data can be exchanged and processed as a result of a transaction request.

The financial computing device 110 can also query, via the network 120, one or more POS computing device nodes 132 for information associated with transactions performed on the distributed ledger network 130. For example, the financial computing device 110 can send commands (e.g., data retrieval command, cryptogram generation command, transaction processing command) to the distributed ledger network 130 such that one or more processing circuits (e.g., processing circuit 134 in FIGS. 3A-3C) of the one or more POS computing device nodes 132 can execute the command. Some functionality and characteristics are further explained in detail with reference to FIGS. 3A-3C. In some examples, the command may receive a response indicating and/or providing data associated with the executed command on the distributed ledger network 130.

In some arrangements, the distributed ledger network 130 can include additional functions (e.g., execute smart contracts, store biometrics). That is, the distributed ledger network 130 can execute smart contracts and store a biometric dataset associated with individuals of one or more financial institutions. The distributed ledger network 130 can include a plurality of nodes that are interconnected with one another to form a peer-to-peer network. As shown in FIG. 1A, the distributed ledger network 130 includes POS computing device nodes 132A, 132B, 132C, 132D that are interconnected with one another to form the peer-to-peer network. Each of the POS computing device nodes 132 on the distributed ledger network 130 include hardware elements, one or more processors (e.g., any general purpose or special purpose processor), and/or be operably coupled to one or more transitory and/or non-transitory storage mediums and/or memory devices (e.g., any computer-readable storage media, such as a magnetic storage, optical storage, flash storage, RAM, etc.).

The POS computing device nodes 132 can be a computing system associated with an individual (e.g., small business owner) or entity (e.g., fortune 500 company, business, institution) with whom an individual seeks to transact (e.g., merchants, service providers, etc.). The POS computing device nodes 132 is further configured to receive transaction information from an individual and create a transaction request that can be processed by the POS computing device nodes 132, and/or collectively utilizing systems and resources on the distributed ledger network 130. The transaction request may be a request for the financial computing device 110 to withdraw a designated sum of funds from a financial account corresponding to the transaction information and deposit the designated sum of funds into an account associated with the requesting party (e.g., an individual or entity associated with the POS computing device nodes 132). The transaction request may be a request for the financial computing device 110 to debit a financial account corresponding to the transaction information and credit an account associated with the requesting party. For example, the POS computing device nodes 132 may also include ATMs, one or more servers configured to process online or P2P transactions, and so on.

In various arrangements, the POS computing device nodes 132 can operate as a point-of-sale device such that each POS computing device node can include a display, an input device and an application. The display may be used to present transaction information, account information, exchange information, and the like to an individual (e.g., customer). The input device may be used to provide input to the POS computing device nodes 132, and/or to financial computing device 110 through the network 120. The input may relate to a payment method (e.g., biometric sample) used to facilitate transactions on the distributed ledger network 130. The input device may include a keyboard, a mouse, a touchscreen, a biometric sensor (e.g., fingerprint sensor, iris sensor, hand sensor, face sensor, keystroke sensor, signature sensor, voice sensor), a microphone, a camera (e.g., facial recognition camera), a geographic locator (e.g., global positioning system (GPS)), and so on. The application may include program logic (e.g., stored executable instructions) configured to implement at least some of the functions described herein. The application may simply be a web browser (e.g., Internet Explorer®, Chrome®, Safari®, etc.) configured to receive and display web pages received from the distributed ledger network 130 and/or financial computing device 110. In other arrangements, the application may include a dedicated application (e.g., a smartphone application), a text message interface, or another program suitable for communicating with the POS computing device nodes 132. Additional details relating to the functions of the distributed ledger network 130, and POS computing nodes 132 are provided herein with respect to FIG. 3A.

Figure 1B:
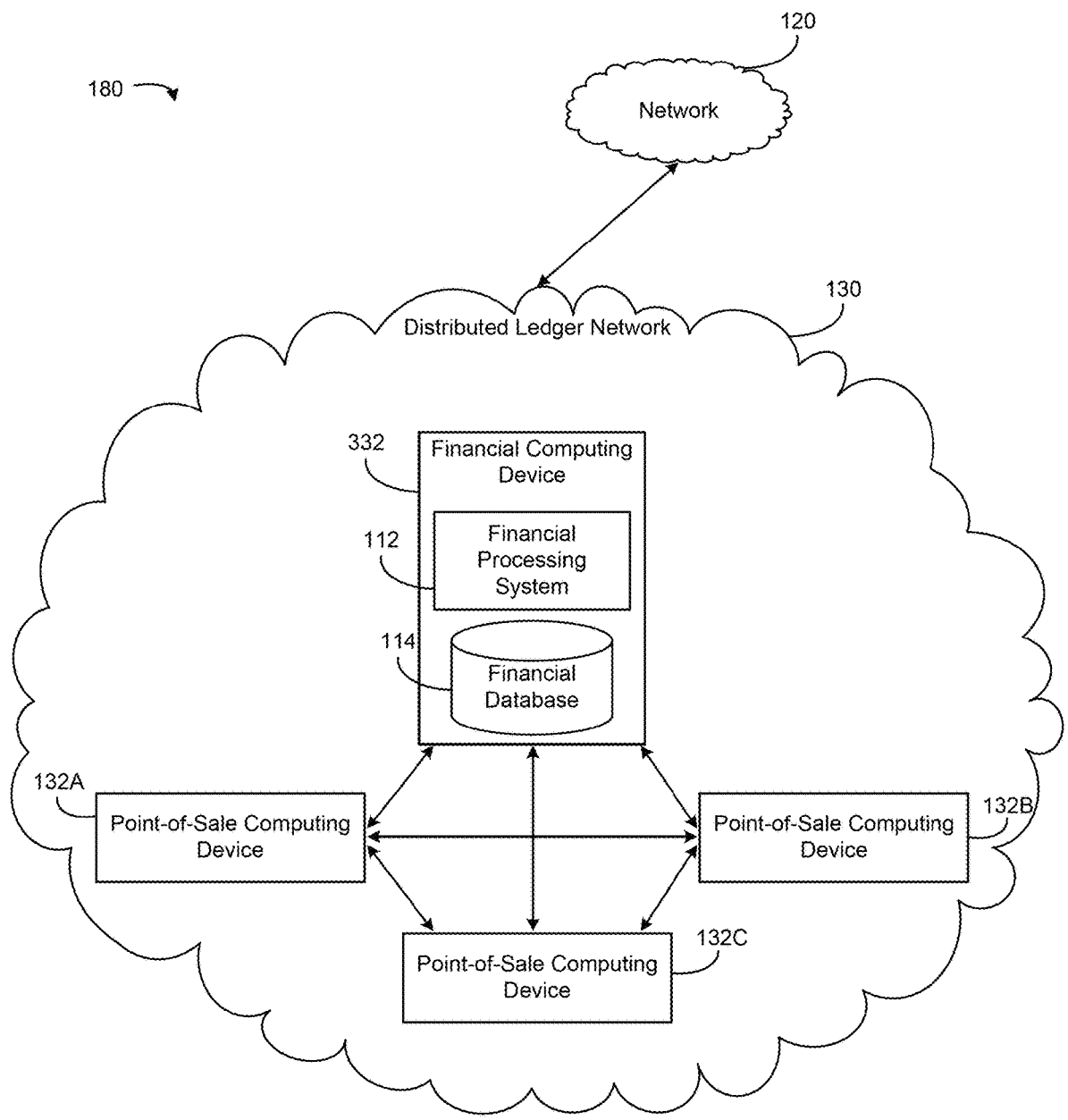
FIG. 1B is a block diagram depicting an example of a system for completing a cardless transaction on a distributed ledger network, according to some arrangements.

Referring now to FIG. 1B, a block diagram depicting an example of a system 180 for completing a cardless transaction on a distributed ledger network 130 is shown, according to some arrangements. The system 180 includes the financial processing system 112, the financial database 114, the network 120, the distributed ledger network 130, and the point-of-sale computing devices 132A, 132B, and 132C (POS computing device nodes 132). However, as shown, in some arrangements, the distributed ledger network 130 includes a financial computing device 332 (collectively referred to herein as "financial node 332") that can be interconnected with the POS computing device nodes 132 to form a peer-to-peer network (e.g., distributed ledger network 130). Indeed, since the financial node 332 is on the distributed ledger network 130, the financial node 332 can perform operations (e.g., complete a transaction) on the distributed ledger network 130. For example, instead of communicating over the network 120 for various transaction operations and related computing tasks, the financial node 332 can generate, authenticate, and/or process various cardless transactions (e.g., communicating with POS computing device nodes 132) on the distributed ledger network 130. In some arrangements, the financial node 332 and POS computing device nodes 132 can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks). Additional details relating to the functions of the distributed ledger network 130 and the analysis node 332 are provided herein with respect to FIG. 3C.

Figure 2A:
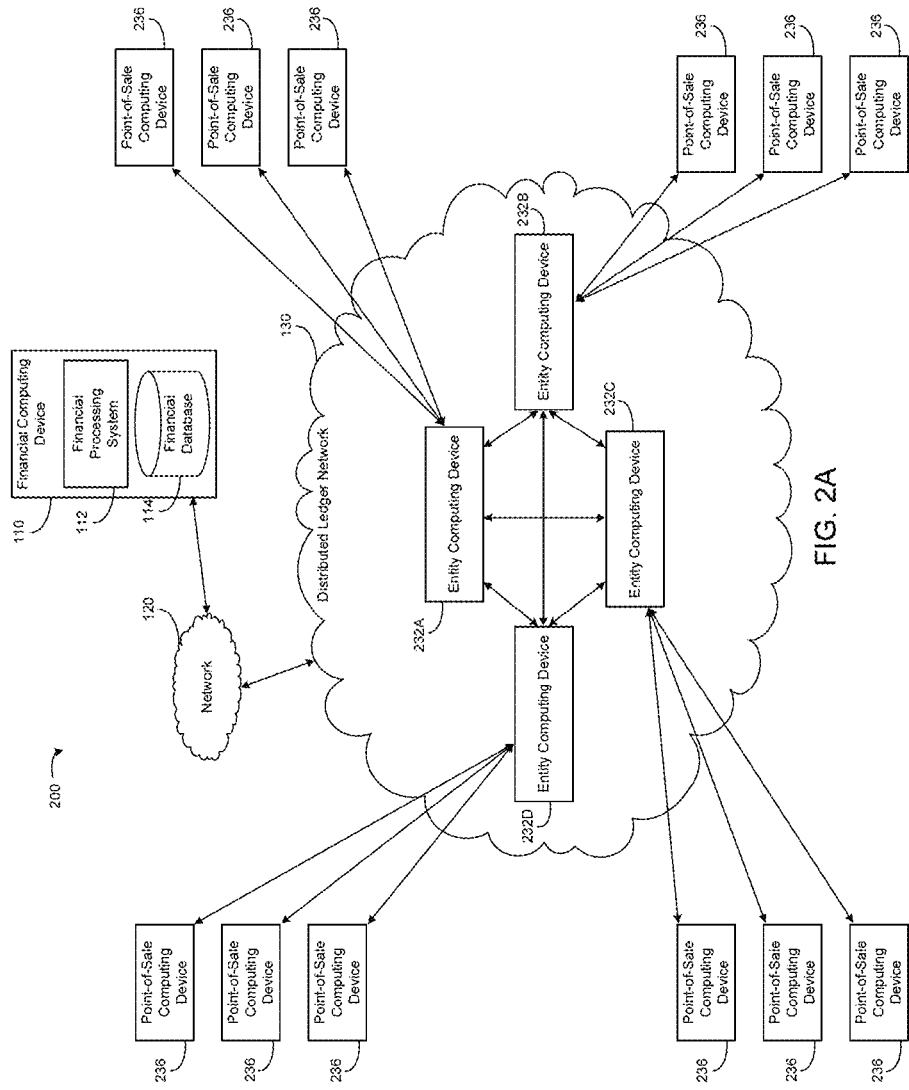
FIG. 2A is a block diagram depicting another example of a system for completing a cardless transaction on a distributed ledger network, according to some arrangements.

Referring now to FIG. 2A, a block diagram depicting another example of a system 200 for completing a cardless transaction on a distributed ledger network 130 is shown, according to some arrangements. The system 200 includes the financial computing device 110, the financial processing system 112, the financial database 114, the network 120, and the distributed ledger network 130 as described with respect to FIG. 1A. However, as shown, in some arrangements, the distributed ledger network 130 includes entity computing device nodes 232A, 232B, 232C, 232D, 232E, 232F (collectively referred to herein as "entity computing device nodes 232") that are interconnected with one another to form a peer-to-peer network (e.g., distributed ledger network 130). Each of the entity computing device nodes 232 can include a plurality of point-of-sale computing devices 236 such that each of the entity computing device nodes 232 can also be interconnected with a plurality of POS computing devices 236. In some arrangements, the plurality of POS computing devices 236 can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks). Additional details relating to the functions of the distributed ledger network 130 and the entity computing device nodes 232 are provided herein with respect to FIG. 3B.

Figure 2B:
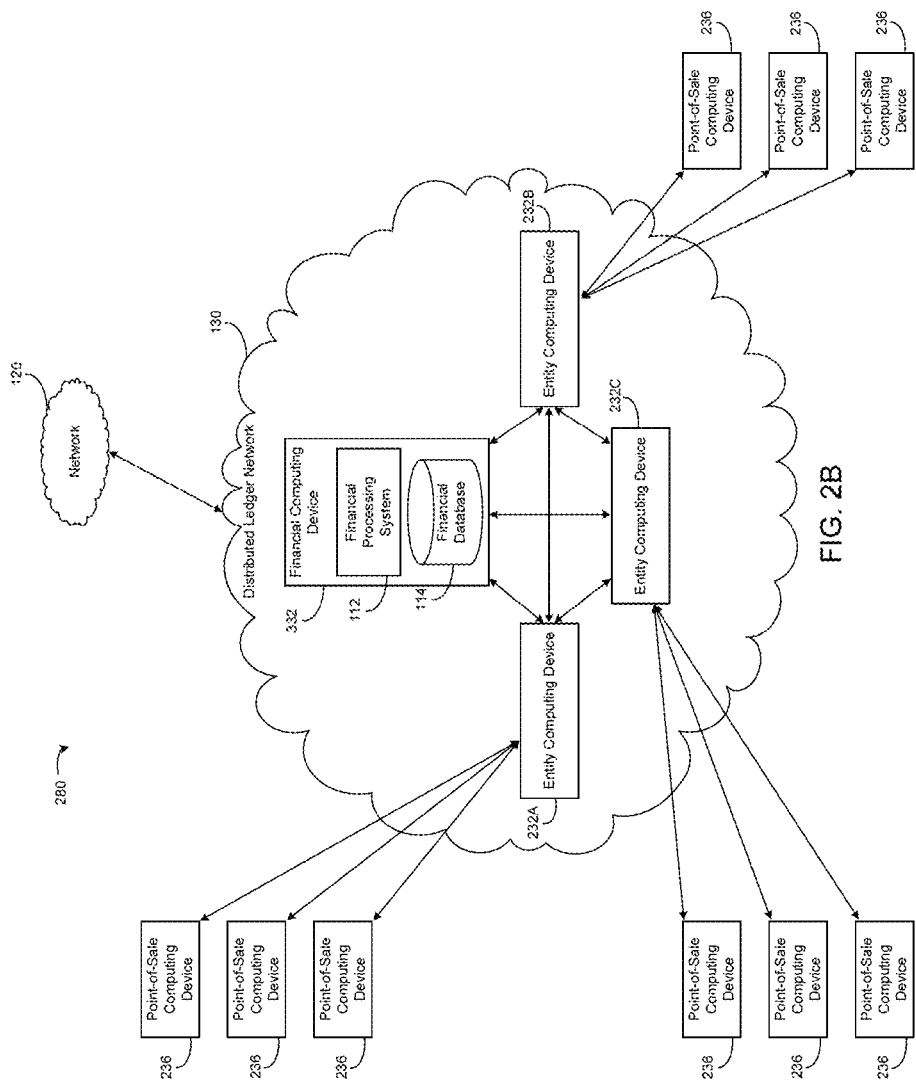
FIG. 2B is a block diagram depicting another example of a system for completing a cardless transaction on a distributed ledger network, according to some arrangements.

Referring now to FIG. 2B, a block diagram depicting an example of a system 280 for completing a cardless transaction on a distributed ledger network 130 is shown, according to some arrangements. The system 280 includes the financial processing system 112, the financial database 114, the network 120, the distributed ledger network 130, the entity computing devices 232A, 232B, and 232C (entity computing device nodes 232), and the POS computing devices 236. However, as shown, in some arrangements, the distributed ledger network 130 includes a financial computing device 332 (collectively referred to herein as "financial node 332") that can be interconnected with the entity computing device nodes 232 to form a peer-to-peer network (e.g., distributed ledger network 130). Indeed, since the financial node 332 is on the distributed ledger network 130, the financial node 332 can perform operations (e.g., complete a transaction) on the distributed ledger network 130 (similarly described with reference to FIG. 1). For example, instead of communicating over the network 120 for various transaction operations and related computing tasks, the financial node 332 can generate, authenticate, and/or process various cardless transactions (e.g., communicating with entity computing device nodes 232) on the distributed ledger network 130. In some arrangements, the financial node 332 and entity computing device nodes 232 can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks). Additional details relating to the functions of the distributed ledger network 130 and the analysis node 332 are provided herein with respect to FIG. 3C.

Figure 3A:
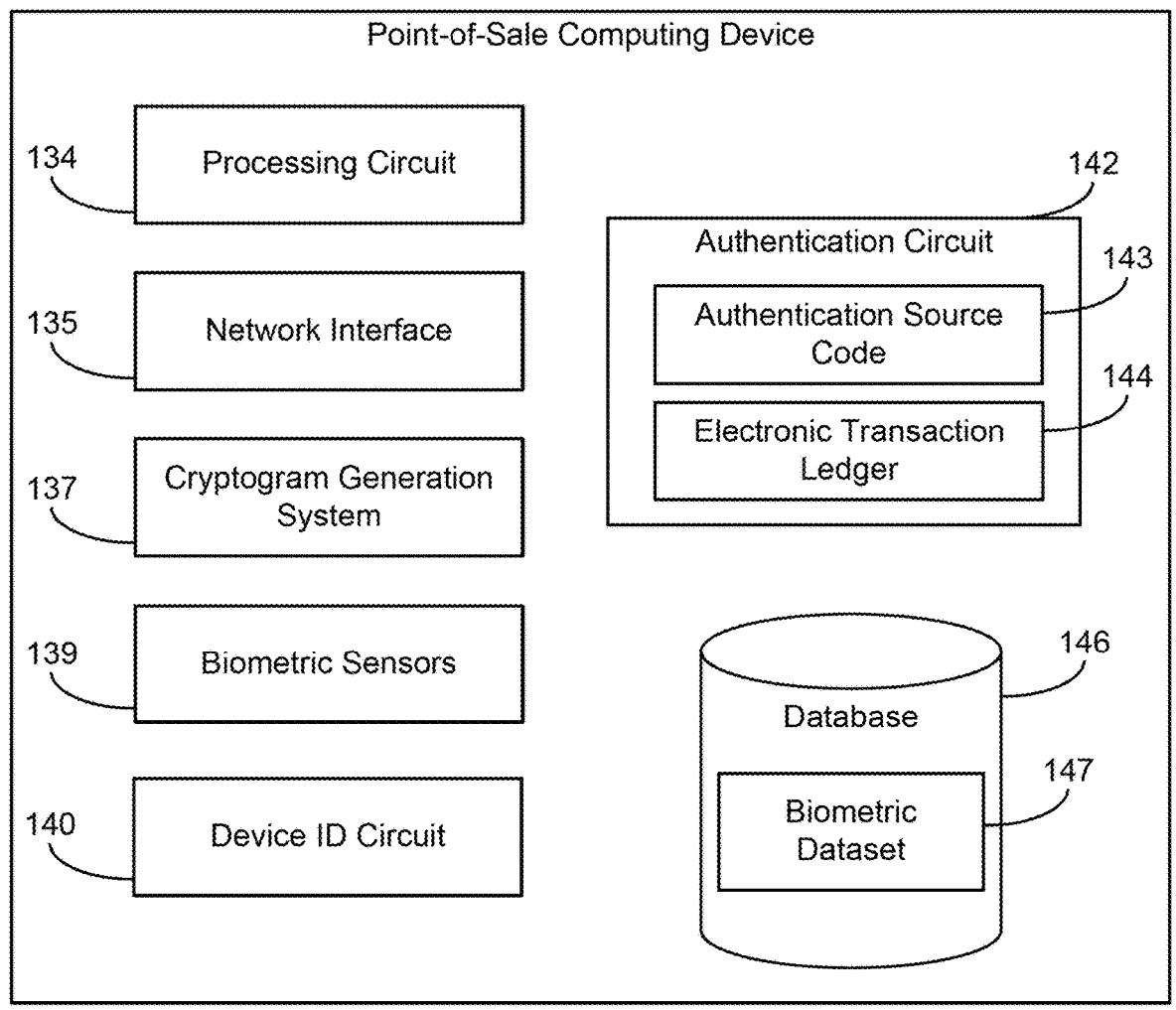
FIG. 3A is a block diagram depicting an example of a distributed ledger node, according to some arrangements.

Referring now to FIG. 3A, a block diagram depicting an example of a point-of-sale computing device node 132 (referred to herein as "POS computing device node 132") POS computing device node 132 of the distributed ledger network 130 in FIG. 1A is shown, according to some arrangements That is, any of the nodes (e.g., 132A, 132B, 132C, 132D) in FIG. 1A may be a POS computing device node 132 in FIG. 3A. While various circuits, interfaces, and logic with particular functionality are shown, it should be understood that the POS computing device node POS computing device node 132 can include any number of circuits, interfaces, and logic for facilitating the functions described herein. For example, the activities of multiple circuits may be combined as a single circuit and implemented on a single processing circuit (e.g., processing circuit 134), as additional circuits with additional functionality are included.

The POS computing device node 132 can be run or otherwise be executed on one or more processors of a computing device, such as those described below in detail with reference to FIG. 5. In broad view, the POS computing device node 132 can include a processing circuit 134, a network interface 135, a cryptogram generation system 137, biometric sensors 139, a device ID circuit 140, an authentication circuit 142, authentication source code 143, a transaction ledger 144, a database 146, and a biometric dataset 147. In some arrangements, POS computing device node 132 can include a processing circuit 134 composed of one or more processors and memory.

The POS computing device node 132 can include a network interface 135 configured to establish a communication session with a computing device for sending and receiving data over the network 120 to the computing device. Accordingly, the network interface 135 includes a cellular transceiver (supporting cellular standards), a global positioning system (GPS) transceiver (supporting GPS standards), a local wireless network transceiver (supporting 802.11X, ZigBee, Bluetooth, Wi-Fi, or the like), a wired network interface, a combination thereof (e.g., both a cellular transceiver, GPS transceiver, and a Bluetooth transceiver), and/or the like. In some arrangements, the POS computing device node 132 includes a plurality of network interfaces 135 of different types, allowing for connections to a variety of networks, such as local area networks or wide area networks including the Internet, via different subnetworks.

The POS computing device node 132 can include a device identification circuit 140 (shown in FIG. 3A as device ID circuit 140) configured to generate and/or manage a device identifier associated with the POS computing device node 132. The device identifier may include any type and form of identification used to distinguish the POS computing device node 132 from other computing devices and/or other distributed ledger nodes. In some arrangements, a device identifier may be associated with one or more other device identifiers. In some arrangements, to preserve privacy, the device identifier may be cryptographically generated, encrypted, or otherwise obfuscated by any circuit of the POS computing device node 132. In some arrangements, the POS computing device node 132 may include the device identifier in any communication that the POS computing device node 132 sends to a computing device.

The POS computing device node 132 can include an authentication circuit 142 composed of authentication source code 143 and an electronic transaction ledger 144. The authentication source code 143 may be stored in memory of processing circuit 134, which may be accessed by and/or run on processing circuit 134. The electronic transaction ledger 144 may be stored on the same and/or different processor readable memory, which may be accessible by processing circuit 134 when running the authentication source code 143. In some arrangements, the electronic transaction ledger 144 on a first node (e.g., POS computing device node 132A in FIG. 1A) of a distributed ledger network corresponds with the electronic transaction ledger of one or more nodes within the distributed ledger network, to the extent that the nodes have synchronized/updated their electronic transaction ledgers (e.g., biometric samples of a plurality of payment accounts). Accordingly, the electronic transaction ledger 144 may be a public ledger. In various arrangements, the authentication circuit 142 may be implemented by a processor of the processing circuit 134. In some arrangements, the electronic transaction ledger 144 can contain all the biometric samples associated with a plurality of payment accounts of a financial institution. Further, the biometric samples may be sorted on the electronic transaction ledger 144 in a plurality of techniques (e.g., by payment account, by geographic region, by date). In various arrangements, the authentication circuit may utilize a stored image associated with the payment account and cross-reference the stored image with an image captured by a camera of the POS computing device node 132 before completing any transaction. In some implementations, the image may be validated utilizing any system described herein.

In some arrangements, transaction on a distributed ledger network include utilizing smart contracts (e.g., virtual contracts/agreements) As used herein, the phrase "smart contract" generally refers to a self-executing code (e.g., in a distributed ledger network or other system) that executes when a set of conditions that have been agreed upon by the parties of the smart contract are met. Although the figures and specification generally discuss utilizing smart contracts on transactions, the systems, methods, and apparatuses disclosed herein can also be used for a plurality of and types of financial services, such as but not limited to deeds, leases, wills, non-smart contracts, traditional legal contracts, and other types of agreements between multiple parties. That is, parties to the smart contract or other types of agreements may be individuals, companies, organizations, and so on.

The POS computing device node 132 can include at least one database 146. The database 146 can include data structures (e.g., datasets) for storing information such as the metadata about transactions (e.g., smart contract execution history), biometric information, distributed ledger node information, or additional information. Further, the data stored in the database 146 may include personal information (e.g., names, addresses, phone numbers, and so on), authentication information (e.g., username/password combinations, device authentication tokens, security question answers, unique client identifiers, biometric data, geographic data, social media data, etc.), and financial information (e.g., token information, account numbers, account balances, available credit, credit history, transaction histories, and so on) relating to the various institutions and individuals. The database 146 can be part of the POS computing device node 132, or a separate component that the POS computing device node 132, and/or financial computing device 110, can access via the network 120. The database 146 can also be distributed throughout the distributed ledger network 130 and/or system 100. For example, the database 146 can include multiple databases associated with the distributed ledger nodes on the distributed ledger network 130, financial computing device 110, or both. In some arrangements, each node on the distributed ledger network 130 (e.g., 132A, 132B, 132C, 132D) includes a database such that each database contains the same data (e.g., electric transaction ledger data, biometric dataset). In some arrangements, each data structure can be combined into one dataset.

The database 146 can include a data structure (e.g., dataset) associated with a biometric dataset 147. The biometric dataset 147 can include a plurality of biometric data associated with an individual. That is, the biometric data can include, for example, biological (e.g., fingerprint, iris/retina, hand geometry, facial geometry, DNA, etc.) and behavioral (e.g., gait, gesture, keystroke dynamics, speech pattern, foot movement pattern, etc.) characteristics that can distinguish one individual from another. In some arrangements, to preserve privacy, the biometric data associated with the individual may be cryptographically generated, encrypted, or otherwise obfuscated by any circuit of the POS computing device node 132.

In some arrangements, a POS computing device node 132 of a distributed ledger network (e.g., distributed ledger network 130 in FIG. 1A) may be configured to send and/or receive, via the network 120, data associated with the electronic transaction ledger 144 to a financial computing device 110. In various arrangements, a POS computing device node 132 of a distributed ledger network (e.g., distributed ledger network 130 in FIG. 1A) may be configured to send and/or receive, via the network 120, data associated with the database 146 to a financial computing device 110. In some arrangements, after a successful completion and/or failure of an execution of a command/commands, the network interface 135 may provide a confirmation/failure notification to one or more systems described herein (e.g., system 100 in FIG. 1A).

The POS computing device node 132 can be further configured to receive user input from, and provide information to a user of the POS computing device node 132. For example, the user may be a customer making a purchase of a good utilizing a POS computing device node 132 associated with a merchant selling the good. In another example, the user may be an individual renewing a license utilizing a POS computing device node 132 associated with a governmental agency. In yet another example, the user may be a group of individuals making a purchase of a service utilizing a POS computing device node 132 associated with a service provider providing the service. In this regard, the POS computing device node 132 is structured to exchange data, communications, instructions, etc. with an input/output component of the POS computing device node 132. Accordingly, POS computing device node 132 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, a sensor, etc.). One or more user interfaces may be internal to the housing of the POS computing device node 132, such as a built-in display, touch screen, microphone, etc., or external to the housing of the POS computing device node 132, such as a monitor connected to the POS computing device node 132, a speaker connected to the POS computing device node 132, etc., according to various arrangements.

In some arrangements, the POS computing device node 132 includes communication circuitry for facilitating the exchange of data, values, messages, and the like between the input/output device and the components of the POS computing device node 132. In some arrangements, the POS computing device node 132 includes machine-readable media for facilitating the exchange of information between the input/output device and the components of the POS computing device node 132. In still another arrangement, the POS computing device node 132 includes any combination of hardware components (e.g., a touchscreen, biometric sensor), communication circuitry, and machine-readable media.

In various arrangements, an individual associated with a payment account at a financial institution can enroll one or more biometric samples with the distributed ledger network 130. In some arrangements, enrollment may include the individual providing a biometric sample to a computing device. For example, enrollment may include the individual providing a biometric sample utilizing the biometric sensors 139 of the POS computing device node 132. In another example, enrollment may include the individual providing biometric samples utilizing a computing device of the individual (e.g., phone, laptop, computer, and/or anything that can receive a biometric sample). In yet another example, enrollment may include the individual providing biometric samples utilizing a computing device of a financial institution. (e.g., financial computing device 110, ATM, desktop computer, etc.). During enrollment, the computing device may prompt the individual for identification information, for example, personal information (e.g., names, addresses, phone numbers, and so on), authentication information (e.g., username/password combinations, device authentication tokens, security question answers, unique client identifiers, biometric data, geographic data, social media data, etc.), and/or financial information (e.g., token information, account numbers, account balances, available credit, credit history, exchange histories, and so on) relating to the payment account of individual. In some arrangement, after the individual has been identified, the biometric samples can be enrolled with the payment account of the individual and stored on the distributed ledger network 130. During initial enrollment or at any subsequent time the individual associated with the payment account may also enroll a picture (e.g., two-factor authentication (2FA)) of themselves and during any subsequent authentication a computing device (e.g., POS computing device, financial computing device, and/or entity computing device) may validate the picture before completing the transaction. In this example, the computing device could validate the picture via a camera on the computing device comparing the camera picture with the uploaded picture of the individual. In other arrangements, the individual may enroll in two-factor authentication utilizing a plurality of characteristics that can be utilized to authenticate the individual (e.g., any biological or behavioral characteristic)

Expanding generally on initial enrollment, the POS computing device node 132 can capture one or more biometric samples (e.g., fingerprint, voiceprint, iris image, hand geometry, keystroke patterns, dynamic signatures) (typically two or more samples) from a user via biometric sensors 139. The POS computing device node 132 is tasked with verifying and vetting the individual's identity during initial enrollment. In some instances, this includes vetting the user identity against collateral material such as photo identification, government-issued identification, birth certificates, and the like. Once the identity is verified, each sample can be tokenized, providing security to the underlying biometric data while at rest and transit, and associated with a user identifier unique to the enrolled user on the distributed ledger network 130. The biometric samples (or the tokenized biometric samples) are logged (e.g., now enrolled biometric reference data) as part of the biometric dataset 147 on the distributed ledger network 130. The biometric reference data can be subsequently used to verify the validity of additional biometric sample enrollments in the future. In various arrangements, each biometric sample may be linked to with a particular payment method and/or payment account. That is, each biometric sample may be linked to a different payment method such that a particular biometric sample is indicative of a particular payment method and/or payment account. For example, a right index finger may be linked to credit card W, a left thumb print may be linked to debit card X, a left eye iris may linked to credit card Y, a face may linked to payment account Z, and so on. Further, when a particular biometric sample is provided, the POS computing device node 132 may generate a particular cryptogram associated with the particular biometric sample. For example, a first biometric sample may be associated with a first cryptogram and a second biometric sample that is different than the first biometric sample may be associated with a second cryptogram.

Once enrolled, the one or more biometric samples become enrolled biometric reference data such that they can be utilized by nodes of the distributed ledger network 130 to complete transaction. That is, after the individual enrolls one or more biometric samples with the distributed ledger network 130, each node (e.g., POS computing device nodes 132 in FIG. 1A) can store and/or access the enrolled biometric reference data, such that future transactions made by the individual can be completed by providing a biometric sample at the biometric sensors 139 of the POS computing device node 132.

In some arrangements, the POS computing device node 132 may be configured to receive a transaction request command from the network interface 135, biometric sensors 139, and/or an input/output component by an individual with a payment account at a financial institution. The POS computing device node 132 can include biometric sensors 139 configured to receive biometric input from an individual associated with the transaction request command. The transaction request command can include a biometric sample associated with the individual. That is, the biometric sample could be a biological or behavioral characteristic of the individual. In various arrangements, the biometric sample can be authenticated by cross-referencing the biometric sample with a plurality of enrolled biometric reference data stored the biometric dataset 147. During authenticating, the POS computing device node 132 can reference the biometric dataset 147 and determine if an enrolled biometric reference data matches (e.g., biometric match) the provided biometric sample.

In various arrangements, the biometric sample uniquely identifies the individual such that the POS computing device node 132 can cross-reference one or more databases associated with a plurality of biometric datasets to determine if there is a biometric match. That is, authentication is the process of comparing a submitted biometric sample against some or all enrolled biometric reference data to determine an individual's identity. In some arrangements, the POS computing device node 132 may require that a user first enroll biometric samples with a distributed ledger network and/or distributed ledger node that can be stored in a biometric dataset and used for subsequent biometric matching to verify the user's identity via a biometric sample acquired from the individual. In other arrangements, the POS computing device node 132 processing system may generate a biometric dataset from the user-provided biometric sample so that the user can be enrolled with a distributed ledger network and/or distributed ledger node for subsequent biometric authentication.

In various arrangement, a biometric match can utilize a biometric processing algorithm or a biometric matching algorithm (e.g., stored in database 146). The biometric processing algorithm or a biometric matching algorithm could be based on artificial intelligence or a machine-learning model. For example, a first machine-learning model may be trained to identify particular biometric samples (e.g., fingerprint, face, hand) and output a prediction. In this example, a second machine-learning model may be trained to identify to particular individual based on the identified particular biometric sample. In other examples, a machine-learning model may be trained to identify the biometric sample and the individual associated with the biometric sample. In various arrangements, authenticating the biometric sample may include utilizing a machine learning algorithm (e.g., a neural network, convolutional neural network, recurrent neural network, linear regression model, and sparse vector machine). The POS computing device node 132 can input one or more biometric samples into the machine learning model, and receive an output from the model indicating if there is a biometric match. Additional details associated with the transaction request command is described in detail with reference to method 400 in FIG. 4.

Expanding generally on the biometric matching algorithm, the POS computing device node 132 may utilize various sensors and/or algorithms to execute the biometric matching algorithm for a plurality of biometric samples. For example, the POS computing device node 132 may utilize a Minutiae based fingerprint recognition algorithm and an optical scanner and/or capacitive scanner to determine a fingerprint match. In another example, the POS computing device node 132 may utilize a model, wavelet, Gabor filter, and/or hamming distance algorithm and an iris recognition camera to determine an iris match. In yet another example, the POS computing device node 132 may utilize principal component analysis using eigenfaces, linear discriminant analysis, elastic bunch graph matching, the hidden Markov model, the multilinear subspace learning, and/or the neuronal motivated dynamic link matching algorithm and a facial recognition camera to determine a face match. In yet another example, the POS computing device node 132 may utilize acoustic modeling (e.g., digital signal processing) and a microphone to determine a voice match.

In some arrangements, the POS computing device node 132 can be further structured to organize and facilitate the tokenization (e.g., obfuscating the cleartext with a token) of any biometric sample received. This includes tokenizing and detokenizing the biometric samples or the biometric reference templates of the POS computing device node 132. In some arrangements, the POS computing device node 132 may provide the tokenized biometric data to the biometric dataset 147 for inclusion in a plurality of biometric reference data or tokenized biometric samples.

The cryptogram generation system 137 can be structured to organize and facilitate the generation of cryptograms. That is, the cryptogram generation system 137 may include one or more processing circuits that when executed can generate a cryptogram. In some arrangement, the cryptogram generation system 137 can retrieve data stored in the database 146 that can be utilized to generate the cryptogram. In various arrangement, the cryptogram generation system 137 can retrieve data (e.g., via network 120) stored in the financial database 114 that can be utilized to generate the cryptogram. In some arrangements, the database 146 may include a subset of databases such that the cryptogram generation system 137 can analyze each database to determine the appropriate information needed to generate the cryptogram. The cryptogram can be unique to a biometric sample and can be unique for each transaction.

The cryptogram generation system 137 may be configured to execute instructions associated with an algorithm used to generate a cryptogram. In some arrangements, the cryptogram can be a sequence of characters that have been encoded through one or more algorithms to conceal data from unauthorized parties. In other arrangements, the cryptogram is a string of encrypted characters generated by the cryptogram generation system 137 with an encryption key stored in database 146 (e.g., associated with a biometric reference data in biometric dataset 147). In some such arrangements, the cryptogram does not include any payment card information or identifying customer information but may be decrypted to verify that the cryptogram was generated by cryptogram generation system 137 as associated with a biometric sample of an individual. In some arrangements, the POS computing device node 132 can also be structured to decrypt cryptograms to verify the cryptograms were generated by the cryptogram generation system 137 and correspond to an active payment account. In other arrangement, the POS computing device node 132 can decrypt the cryptogram and then process the transaction request. In various arrangements, any computing device described herein can be configured to generate a cryptogram (e.g., POS computing device node 132, entity computing device node 232, financial computing device node 332, and so on).

In various arrangements, the transaction request can be processed based on utilizing the cryptogram with existing payment rails. For example, the POS computing device node 132 may place a hold in the amount of the purchase on a payment account at a financial institution. In this example, POS computing device node 132 may then collect all approved authorizations (e.g., cryptogram) to be processed in a "batch" at the end of the business day. Accordingly, the merchant may provide the customer a receipt (e.g., electronically, paper) to complete the sale. In other arrangements, the transaction request can be processed on the distributed ledger network 130 utilizing the cryptogram and one or more processing circuits (e.g., processing system 134) that includes a transaction processing application. The transaction processing application, when executed, can in real-time deduct the transaction amount of the purchase associated with a payment account of the biometric input and send the funds to a financial institution associated with POS computing device node 132.

In some arrangements, the command may include a smart contract, that when executed by the POS computing device node 132, causes the POS computing device node 132 of the distributed ledger network 130 to monitor/detect the exchanges that are made by the POS computing device node 132. The POS computing device node 132 may store the smart contract in database 146. When an exchange request is sent or received by the POS computing device node 132 on the distributed ledger network 130, the smart contract may execute and as a result update the electric exchange ledger 144 and subsequently the database 146. In various arrangements, each command can include program code (e.g., a script, an executable) that, when executed by a distributed ledger node (e.g., 132A) of the distributed ledger network 130, causes the node to execute a specific set of instructions.

In various arrangements, the command may cause the POS computing device node 132 to send the command (or copies thereof) to other nodes in the distributed ledger network 130, thus causing those nodes to also perform the command. The POS computing device node 132 can include a bus (not shown, discussed in detail with reference to FIG. 5), such as an address/data bus or other communication mechanism for communicating information, which interconnects circuits and/or subsystems (e.g., authentication circuit 142) of the POS computing device node 132. In some arrangements, the POS computing device node 132 may include one or more of any such circuits and/or subsystems.

In some arrangements, the network interface 135 may be implemented with the processor of the POS computing device node 132 and utilize hardware of the POS computing device node 132. In various arrangements, some or all of the circuits of the POS computing device node 132 may be implemented with the processing circuit 134. For example, any of the POS computing device node 132 may be implemented as a software application stored within the memory and executed by the processor of processing circuit 134. Accordingly, such arrangement can be implemented with minimal or no additional hardware costs. In some arrangements, any of these above-recited circuits rely on dedicated hardware specifically configured for performing operations of the circuit.

Figure 3B:
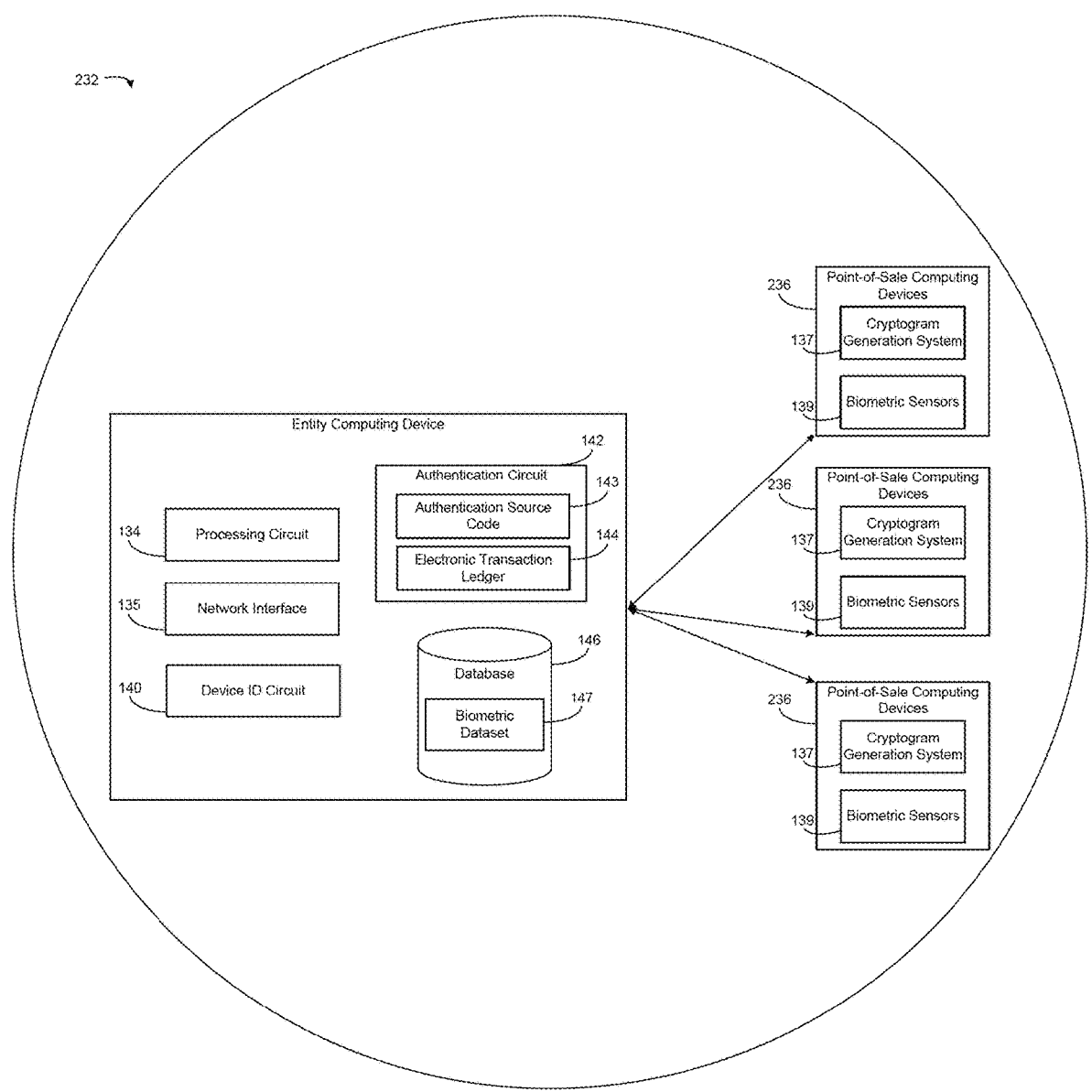
FIG. 3B is a block diagram depicting another example of a distributed ledger node, according to some arrangements.

Referring now to FIG. 3B, a block diagram depicting another example of a distributed ledger node 232 of the distributed ledger network 130 in FIG. 2A is shown, according to some arrangements. The entity computing device nodes 232 includes the processing circuit 134, the network interface 135, the cryptogram generation system 137, biometric sensors 139, the device ID circuit 140, the authentication circuit 142, the authentication source code 143, the electronic transaction ledger 144, the database 146, and the biometric dataset 147 as described with respect to FIG. 3A. However, as shown, in some arrangements, the entity computing device nodes 232 includes a plurality of point-of-sale (POS) computing devices 236. That is, each POS computing device is interconnected with one another to form a network connection (e.g., wireless or wired) within the entity computing device nodes 232. In one example, an entity computing device nodes 232 may be all the POS computing devices 236 at a merchant (e.g., grocery store, bank, eatery, stadium). Whereas, with reference to FIG. 3A, each POS computing device 132 would be an individual node on the distributed ledger network 130. The system 200 includes the financial computing device 110, the financial processing system 112, the financial database 114, the network 120, and the distributed ledger network 130 as described with respect to FIG. 2A.

Figure 3C:
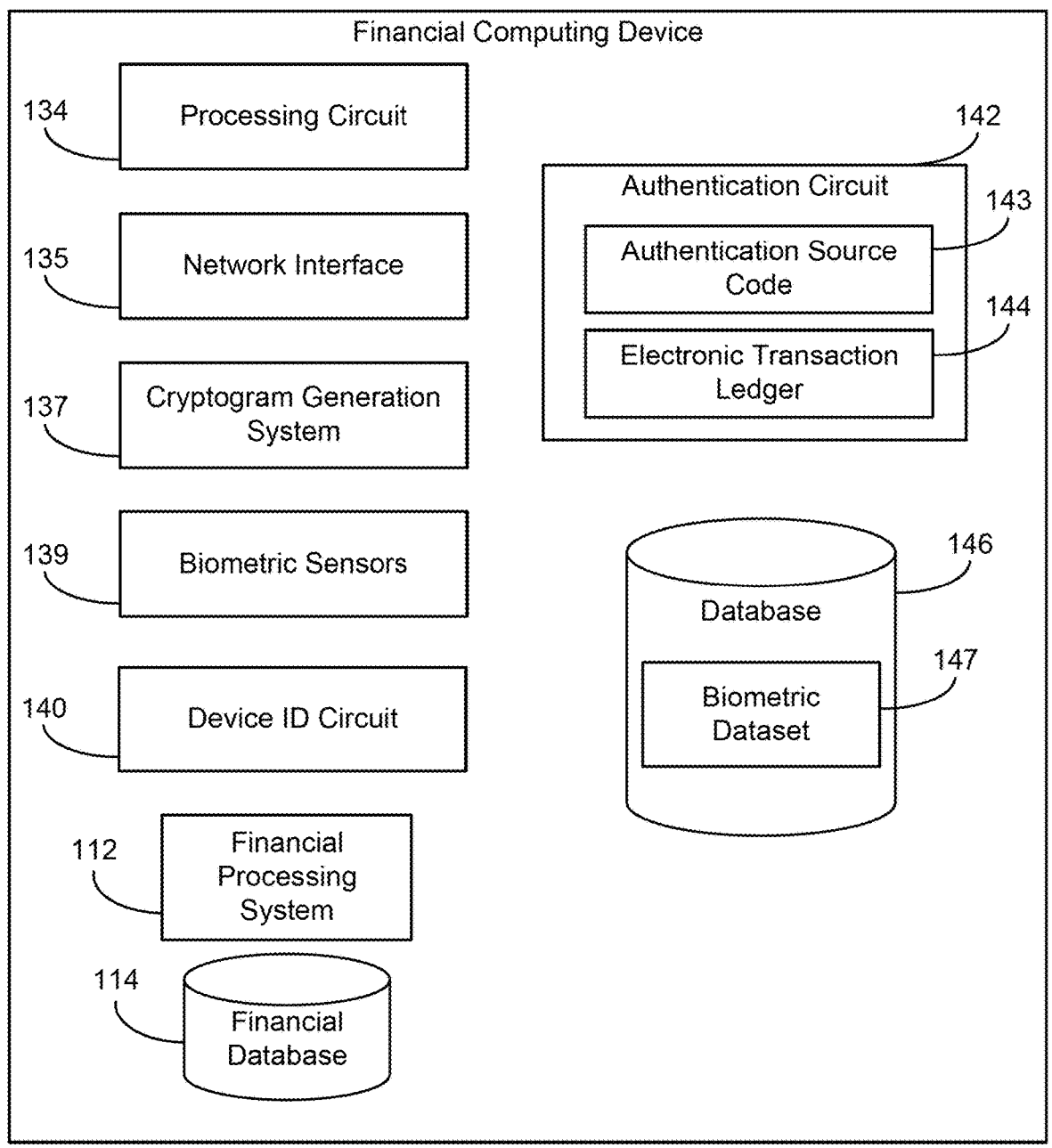
FIG. 3C is a block diagram depicting another example of a distributed ledger node, according to some arrangements.

Referring now to FIG. 3C, a block diagram depicting an example of a financial computing device node 332 of the distributed ledger network 130 in FIG. 1B and FIG. 2B is shown, according to some arrangements. The financial computing device node 332 is shown to include the financial processing system 112, the financial database 114 as described with respect to FIG. 1A. Further, the financial computing device node 332 is shown to include the processing circuit 134, the network interface 135, the cryptogram generation system 137, biometric sensors 139, the device ID circuit 140, the authentication circuit 142, the authentication source code 143, the electronic transaction ledger 144, the database 146, and the biometric dataset 147 as described with respect to FIG. 3A. However, as shown, in some arrangements, the distributed ledger network 130 includes a financial computing device node 332 (collectively referred to herein as "financial node 332") that can be interconnected with the nodes (e.g., 132A, 232A, etc.) to form a peer-to-peer network (e.g., distributed ledger network 130). Indeed, since the financial node 332 is on the distributed ledger network 130, the financial node 332 can perform various operations (e.g., compliance checks) on the distributed ledger network 130. For example, instead of communicating over the network 150 for various cardless transactions and related computing tasks, the financial node 332 can generate, authenticate, and/or process various cardless transactions (e.g., communicating with nodes 132 and/or 232) on the distributed ledger network 130. That is, any of the nodes (e.g., 132A, 132B, 132C, 132D) in FIG. 1A and/or any of the nodes (e.g., 232A, 232B, 232C, 232F) in FIG. 2A may be a financial node 332. While various circuits, interfaces, and logic with particular functionality are shown, it should be understood that the financial node 332 can include any number of circuits, interfaces, and logic for facilitating the functions described herein. For example, the activities of multiple circuits may be combined as a single circuit and implemented on a single processing circuit (e.g., processing circuit 134), as additional circuits with additional functionality are included. In some arrangements, the financial node 332 can execute similar instructions to those of POS computing device node 132 in FIG. 3A and entity computing device nodes 232 in FIG. 3B.

Figure 4:
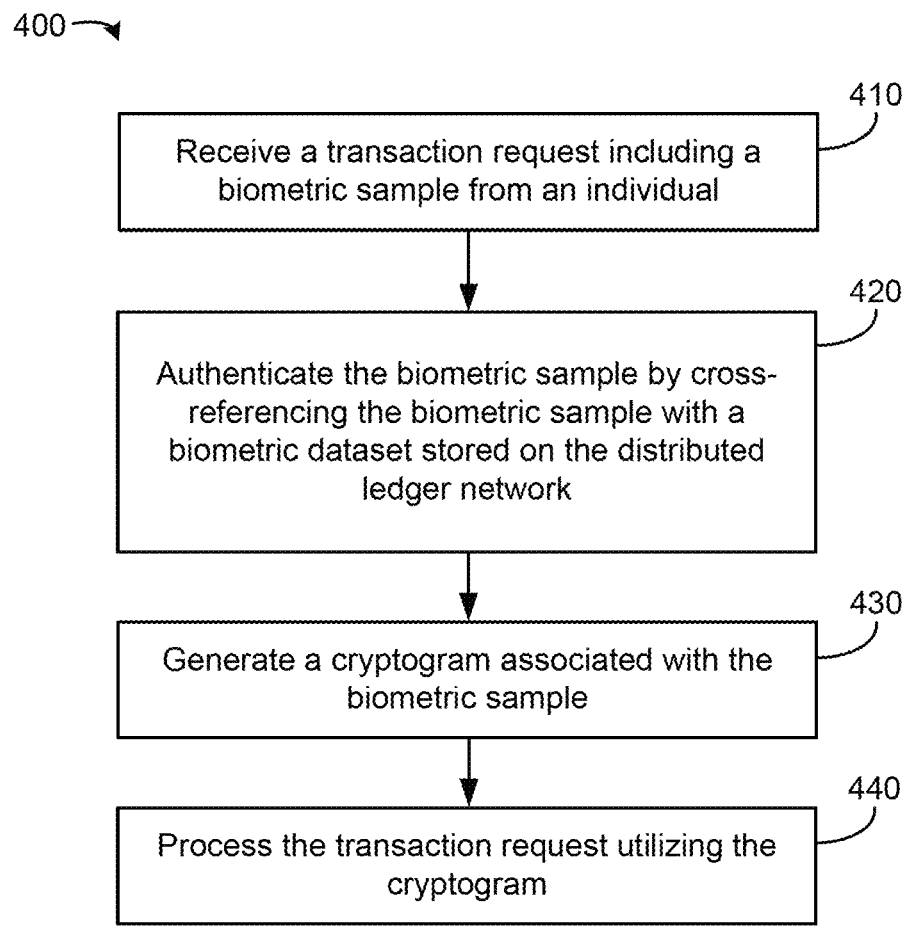
FIG. 4 is a flowchart for a method of completing a cardless transaction on the distributed ledger network, according to some arrangements.

Referring now to FIG. 4, a flowchart for a method 400 of completing a cardless transaction on the distributed ledger network is shown, according to some arrangements. System 100 and/or System 200 can be configured to perform method 400. Further, any computing device described herein can be configured to perform method 400.

In broad overview of method 400, at block 410, the POS computing device receives a transaction request including a biometric sample from an individual. At block 420, the POS computing device authenticates the biometric sample by cross-referencing the biometric sample with a biometric dataset stored on the distributed ledger network. At block 430, the POS computing device generates a cryptogram associated with the biometric sample. At block 440, the POS computing device processes the transaction request utilizing the cryptogram.

Referring to method 400 in more detail, at block 410, the POS computing device receives a transaction request including a biometric sample from an individual associated with a payment account at a financial institution. That is, the transaction request could be for various goods or services. For example, the individual may be trying to purchase groceries at a grocery store. In another example, the individual may be trying to purchase lunch at an eatery. In yet another example, the individual may be trying to purchase a membership at a local gym. In yet another example, the individual may be trying to purchase a dog walking service from a dog walking company. In some arrangements, each transaction request also includes a biometric sample from an individual. That is, the POS computing device can include one or more biometric sensors, such that it can receive a plurality of biological characteristics or behavior characteristics. A "biometric sample" user herein may refer to any biological characteristic or a behavioral characteristic that uniquely identifies the individual from another individual. In one arrangement, the POS computing device may be equipped with a fingerprint sensor such that an individual performing the transaction request can provide their fingerprint. In another arrangement, the POS computing device may be equipped with a facial recognition sensor and an retina sensor such that an individual performing the transaction request can provide their face and/or eye to the particular sensor. In various arrangements, the POS computing device may be equipped with a plurality of sensors configured to receive input from individuals performing transaction requests.

In some arrangements, the individual providing the biometric sample can be associated with a payment account at a financial institution. That is, the individual may have previously registered and/or opened the payment account associated with the financial institution. In various arrangements, the financial institution can include any institution that provides financial services (e.g., payment accounts).

At block 420, the POS computing device authenticates the biometric sample by cross-referencing the biometric sample with a biometric dataset stored on the distributed ledger network. In various arrangements, the biometric sample uniquely identifies the individual such that the POS computing device can cross-reference one or more databases associated with a plurality of biometric datasets to determine if there is a biometric match. That is, authentication is the process of comparing a submitted biometric sample against some or all enrolled biometric reference data to determine an individual's identity. In some arrangements, the POS computing device may require that a user first enroll biometric samples with a distributed ledger network and/or distributed ledger node that can be stored in a biometric dataset and used for subsequent biometric matching to verify the user's identity via a biometric sample acquired from the individual. In other arrangements, the POS computing device processing system may generate a biometric dataset from the user-provided biometric sample so that the user can be enrolled with a distributed ledger network and/or distributed ledger node for subsequent biometric authentication.

In some arrangements, authenticating the biometric sample may include utilizing a machine learning algorithm (e.g., a neural network, convolutional neural network, recurrent neural network, linear regression model, and sparse vector machine). The POS computing device can input one or more biometric samples into the machine learning model and receive an output from the model indicating if there is a biometric match. In various arrangements, if the biometric sample is not authenticated (e.g., not matched), the POS computing device may transmit an "individual not authenticated" message, a no match value or otherwise a negative authentication value to the individual.

At block 430, the POS computing device, in response to authenticating the biometric sample, generates a cryptogram associated with the biometric sample. In some arrangements, the biometric sample may be associated with a unique encryption key and/or unique payment token such that it can be used to create a new cryptogram for each transaction request. That is, each enrolled biometric reference data may include a unique encryption key. The POS computing device may combine the unique encryption key of the biometric sample with data from the POS computing device to generate a cryptogram. In some arrangements, the financial computing device (e.g., financial computing device 332 in FIG. 1B) can generate a cryptogram associated with the biometric sample and execute similar instructions to authenticate the biometric sample. In various arrangements, the cryptogram can be based on the payment instrument (e e.g., POS computing device, mobile phone, financial computing device).

At block 440, the POS computing device processes the transaction request utilizing the cryptogram. In some arrangements, the POS computing device verifies the validity of the cryptogram and approves the payment request. For example, the payment provider (e.g., financial institution) may store the transaction and sends a record to both the seller and buyer and subsequently the goods or services are provided and/or sent to the buyer (e.g., the payment account associated with biometric input) and the buyer's bank (e.g., the financial institution) sends the funds to the seller (e.g., seller associated with the POS computing device).

In some arrangements, the POS computing device may ask for a second biometric sample. That is, to complete a transaction, an individual may be enrolled to perform multi-factor authentication (MFA) such that the transaction can be proceed after two or more pieces of evidence (or at least, a second set of information or credentials) are received (e.g., biometric sample, authentication information, location information (e.g., GPS coordinates, latitude, longitude), and so on). In those instances, the factor(s) to authenticate parties can be acquired through a process called "enrollment." In enrollment, parties and entities establish authentication factors and verifying information which is to be used to authenticate each other in one or more subsequent transactions. The factors may include, for instance, knowledge factors, biometric factors, possession factors, or location factors. In one arrangement, one party provides a biometric factor to the other party such as a fingerprint, which may later be provided again to authenticate the party during a subsequent transaction. In another arrangement, the party provides their location as an authentication factor. In some arrangement, mutual authentication may involve three or more parties, wherein each party authenticates themselves between at least themselves and another party to the transaction. In some arrangements, the POS computing device can complete the transaction locally such that it does not require a network connection. For example, POS computing device may query nodes on the distributed ledger network periodically but store all data utilized to complete a transaction.

Figure 5:
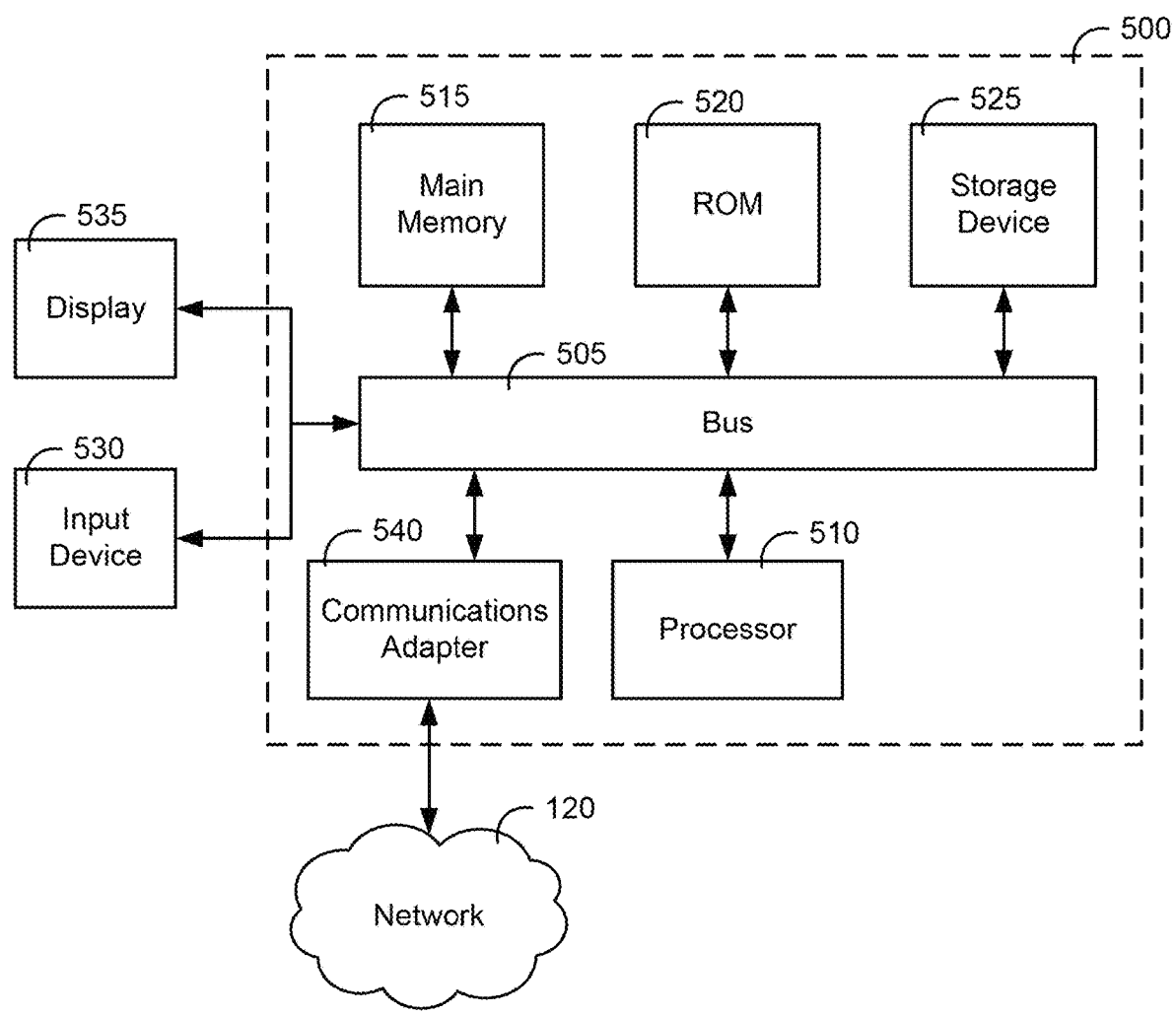
FIG. 5 is a block diagram illustrating an example computing system suitable for use in the various arrangements described herein.

FIG. 5 illustrates a depiction of a computer system 500 that can be used, for example, to implement an example financial computing device 110, an example distributed ledger network 130, an example POS computing device nodes 132, entity computing device nodes 232, and/or various other example systems described in the present disclosure. The computing system 500 includes a bus 505 or other communication component for communicating information and a processor 510 coupled to the bus 505 for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information, and command selections to the processor 510. In another arrangement, the input device 530 has a touch screen display 535. The input device 530 can include any type of biometric sensor, a cursor control, such as a mouse, a trackball, or cursor direction keys, for communicating direction information and command selections to the processor 510 and for controlling cursor movement on the display 535.

In some arrangements, the computing system 500 may include a communications adapter 540, such as a networking adapter. Communications adapter 540 may be coupled to bus 505 and may be configured to enable communications with a computing or communications network 130 and/or other computing systems. In various illustrative arrangements, any type of networking configuration may be achieved using communications adapter 540, such as wired (e.g., via Ethernet), wireless (e.g., via WiFi, Bluetooth, etc.), satellite (e.g., via GPS) pre-configured, ad-hoc, LAN, WAN, etc.

According to various arrangements, the processes that effectuate illustrative arrangements that are described herein can be achieved by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 5, arrangements of the subject matter and the functional operations described in this specification can be carried out using other types of digital electronic circuitry, or in computer software embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively or in addition, the program instructions can be encoded on an artificially-generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing system" or "processor" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD¬ROM and DVD-ROM disks. The processor and the memory can be supplemented by, or incorporated in, special purpose logic circuitry.

To provide for interaction with a user, arrangements of the subject matter described in this specification can be carried out using a computer having a display device, e.g., a QLED (quantum dot display), OLED (organic light-emitting diode), or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile input, or other biometric information. In addition, a computer can interact with a user by sending documents to and receiving documents from a device that is used by the user; for example, by sending web pages to a web browser on a user's client device in response to requests received from the web browser.

Arrangements of the subject matter described in this specification can be carried out using a computing system that includes a back-end component, e.g., as a data server, or that includes a middleware component, e.g., an application server, or that includes a front-end component, e.g., a client computer having a graphical user interface or a web browser through which a user can interact with an arrangement of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some arrangements, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative arrangements, the features disclosed herein may be implemented on a smart television circuit (or connected television circuit, hybrid television circuit, etc.), which may include a processing circuit configured to integrate Internet connectivity with more traditional television programming sources (e.g., received via cable, satellite, over-the-air, or other signals). The smart television circuit may be physically incorporated into a television set or may include a separate device such as a set-top box, Blu-ray or other digital media player, game console, hotel television system, and other companion device. A smart television circuit may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television circuit may be configured to provide a home screen or top level screen including icons for a plurality of different applications, such as a web browser and a plurality of streaming media services, a connected cable or satellite media source, other web "channels," etc. The smart television circuit may further be configured to provide an electronic programming guide to the user. A companion application to the smart television circuit may be operable on a mobile computing device to provide additional information about available programs to a user, to allow the user to control the smart television circuit, etc. In alternate arrangements, the features may be implemented on a laptop computer or other personal computer, a smartphone, other mobile phone, handheld computer, a tablet PC, or other computing device.

While this specification contains many specific arrangement details, these should not be construed as limitations on the scope of the present disclosure or of what may be claimed, but rather as descriptions of features specific to particular arrangements of the present disclosure. Certain features that are described in this specification in the context of separate arrangements can also be carried out in combination or in a single arrangement. Conversely, various features that are described in the context of a single arrangement can also be carried out in multiple arrangements, separately, or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the arrangements described above should not be understood as requiring such separation in all arrangements, and it should be understood that the described program components and systems can generally be integrated together in a single software product or packaged into multiple software products embodied on tangible media.

Thus, particular arrangements of the subject matter have been described. Other arrangements are within the scope of the following claims. In some cases, the actions recited in the claims can be performed in a different order and still achieve desirable results. In addition, the processes depicted in the accompanying figures do not necessarily need the particular order shown, or sequential order, to achieve desirable results. In certain arrangements, multitasking and parallel processing may be advantageous.

What is claimed is:

1. A method of completing cardless transactions on a distributed ledger network, the method comprising:
   storing, by a point-of-sale (POS) computing device on the distributed ledger network, a dataset for payment accounts associated with individuals, the dataset comprising a plurality of samples, wherein the POS computing device is part of the distributed ledge network, and wherein the dataset is accessible by other POS computing devices via the distributed ledger network;
   receiving, by the POS computing device, a cardless transaction request for an amount from an individual, wherein the POS computing device is a payment instrument, and wherein the cardless transaction request is associated with authenticating and processing the cardless transaction request for the amount with at least one of a biological characteristic or a behavioral characteristic that uniquely identifies the individual from another individual;
   in response to receiving the cardless transaction request, receiving, by the POS computing device, a sample from the individual associated with the biological characteristic or the behavioral characteristic using a sensor at the POS computing device, the individual associated with a payment account of the payment accounts at a financial institution, wherein the POS computing device is a node of a plurality of nodes on the distributed ledger network, wherein the sensor is at least one of a fingerprint sensor, a facial recognition sensor or camera, an iris sensor, a hand sensor, or a sound sensor;
   cross-referencing, by the POS computing device, the sample with the dataset stored on the distributed ledger network; identifying, by the POS computing device utilizing a first model trained to identify particular samples, the sample is a particular sample;
   determining, by the POS computing device utilizing a second model trained to identify particular individuals based on the particular sample identified and outputted by the first model, the sample matches an enrolled sample of the dataset, wherein the first model and second model corresponds to at least one of an artificial intelligence model or a machine-learning model trained to output indicating a match between the sample and the enrolled sample;
   in response to the first model and second model matching the sample to the stored sample, determining, by the POS computing device, that the sample is authenticated;
   in response to authenticating the sample, generating, by the POS computing device, a cryptogram of a plurality of cryptograms based on an encryption key and the payment instrument identifier of the payment instrument, wherein the cryptogram is unique to the sample and the cardless transaction request, wherein each cryptogram of the plurality of cryptograms is associated with at least one sample of the plurality of samples of the dataset, wherein the cryptogram is a new cryptogram unique to the cardless transaction request based on the cardless transaction request and the sample; and
   executing, by the POS computing device, a transaction processing application to process the cardless transaction request utilizing payment rails and utilizing the cryptogram, wherein processing comprises transmitting the cardless transaction request comprising the cryptogram to a financial computing device associated with the financial institution.

2. The method of claim 1, further comprising: receiving, by the POS computing device from the individual, an enrollment request including payment account information associated with the individual; and sending, by the POS computing device to the distributed ledger network, the payment account information and the sample.

3. The method of claim 2, wherein the payment account information includes information corresponding to a payment card associated with the individual.

4. The method of claim 1, wherein the dataset includes a plurality of reference data uniquely identifying a plurality of individuals, and wherein each reference data is associated with a unique encryption key and a particular individual.

5. The method of claim 4, wherein cross-referencing the sample with the dataset stored on the distributed ledger network further comprising matching the sample with a reference data of the plurality of reference data uniquely identifying the individual.

6. The method of claim 1, further comprising: receiving, by the POS computing device, a second cardless transaction request including a second sample from the individual; authenticating, by the POS computing device, the second sample by cross-referencing the second sample with the dataset; in response to authenticating the second sample, generating, by the POS computing device, a second cryptogram associated with the second sample; and executing, by the POS computing device, the transaction processing application to process the cardless transaction request utilizing the second cryptogram.

7. The method of claim 1, wherein the cardless transaction request is associated with at least one of a purchase of a good, or a purchase of a service.

8. A computing system comprising a point-of-sale (POS) computing device, the POS computing device comprising:
  a sensor;
  a processing circuit, the processing circuit coupled to the sensor and further comprising at least one processor and memory storing instructions, when executed by the at least one processor, causes the at least one processor to:
    receive, by the sensor, a sample from an individual associated with a biological characteristic or a behavioral characteristic, wherein the sensor is at least one of a fingerprint sensor, a facial recognition sensor or camera, an iris sensor, a hand sensor, a sound sensor;
    store, on a distributed ledger network, a dataset for payment accounts associated with individuals, the dataset comprising a plurality of samples, wherein the POS computing device is part of the distributed ledge network, and wherein the dataset is accessible by other POS computing devices via the distributed ledger network;
    receive a cardless transaction request for an amount including the sample from the individual associated with the biological characteristic or the behavioral characteristic using the sensor at the POS computing device, the individual associated with a payment account of the payment accounts at a financial institution, wherein the POS computing device is a node of a plurality of nodes on the distributed ledger network, and wherein the POS computing device is a payment instrument, and wherein the cardless transaction request for the amount is associated with authenticating and processing the cardless transaction request with at least one of the biological characteristic or the behavioral characteristic that uniquely identifies the individual from another individual;
    cross-reference the sample with the dataset stored on the distributed ledger network;
    identify, utilizing a first model trained to identify particular samples, the sample is a particular sample;
    determine, utilizing a second model trained to identify particular individuals based on the particular sample identified and outputted by the first model, the sample matches an enrolled sample of the dataset, wherein the first model and second model corresponds to at least one of an artificial intelligence model or a machine-learning model trained to output indicating a match between the sample and the enrolled sample;
    in response to the first model and second model matching the sample to the stored sample, determine that the sample is authenticated;
    in response to authenticating the sample, generate a cryptogram of a plurality of cryptograms based on an encryption key and the payment instrument identifier of the payment instrument, wherein the cryptogram is unique to the sample and the cardless transaction request, wherein each cryptogram of the plurality of cryptograms is associated with at least one sample of the plurality of samples of the dataset, wherein the cryptogram is a new cryptogram unique to the cardless transaction request based on the cardless transaction request and the sample; and
    execute a transaction processing application to process the cardless transaction request utilizing payment rails and utilizing the cryptogram, wherein processing comprises transmitting the cardless transaction request comprising the cryptogram to a financial computing device associated with the financial institution.

9. The computing system of claim 8, wherein the POS computing device is further configured to: receive, from the individual, an enrollment request including payment account information associated with the individual; and send, to the distributed ledger network, the payment account information and the sample.

10. The computing system of claim 1, wherein the dataset includes a plurality of reference data uniquely identifying a plurality of individuals, and wherein each reference data is associated with a unique encryption key and a particular individual.

11. The computing system of claim 10, wherein cross-referencing the sample with the dataset stored on the distributed ledger network further comprising matching the sample with a reference data of the plurality of reference data uniquely identifying the individual.

12. One or more non-transitory computer-readable storage media having instructions stored thereon that, when executed by at least one processing circuit of a point-of-sale (POS) computing device, cause the at least one processing circuit to:
  store, on a distributed ledger network, a dataset for payment accounts associated with individuals, the dataset comprising a plurality of samples, wherein the POS computing device is part of the distributed ledge network, and wherein the dataset is accessible by other POS computing devices via the distributed ledger network;
  receive a cardless transaction request for an amount including a sample from an individual associated with a biological characteristic or a behavioral characteristic using a sensor at the POS computing device, the individual associated with a payment account of the payment accounts at a financial institution, wherein the at least one processing circuit is a node of a plurality of nodes on the distributed ledger network, and wherein the at least one processing circuit is a payment instrument, and wherein the cardless transaction request for the amount is associated with authenticating and processing the cardless transaction request with at least one of the biological characteristic or the behavioral characteristic that uniquely identifies the individual from another individual;
  cross-reference the sample with the dataset stored on the distributed ledger network;
  identify, utilizing a first model trained to identify particular samples, the sample is a particular sample;
  determine, utilizing a second model trained to identify particular individuals based on the particular sample identified and outputted by the first model, the sample matches an enrolled sample of the dataset, wherein the first model and second model corresponds to at least one of an artificial intelligence model or a machine-learning model trained to output indicating a match between the sample and the enrolled sample, and wherein the at least one of the artificial intelligence model or the machine-learning model comprises a first model trained to identify particular samples based on the dataset and a second model trained to identify particular individuals based on the particular samples identified by the first model;
  in response to the first model and second model matching the sample to the stored sample, determine that the sample is authenticated;

in response to authenticating the sample, generate a cryptogram of a plurality of cryptograms based on an encryption key and the payment instrument identifier of the payment instrument, wherein the cryptogram is unique to the sample and the cardless transaction request, wherein each cryptogram of the plurality of cryptograms is associated with at least one sample of the plurality of samples of the dataset, wherein the cryptogram is a new cryptogram unique to the cardless transaction request based on the cardless transaction request and the sample; and execute a transaction processing application to process the cardless transaction request utilizing payment rails and utilizing the cryptogram, wherein processing comprises transmitting the cardless transaction request comprising the cryptogram to a financial computing device associated with the financial institution.

13. The one or more non-transitory computer-readable storage media of claim 12, wherein the dataset includes a plurality of reference data uniquely identifying a plurality of individuals, and wherein each reference data is associated with a unique encryption key and a particular individual.

14. The one or more non-transitory computer-readable storage media of claim 13, wherein cross-referencing the sample with the dataset stored on the distributed ledger network further comprising matching the sample with a reference data of the plurality of reference data uniquely identifying the individual.

\* \* \* \* \*